United States Patent

[11] 3,630,341

| [72] | Inventor | Steve Theodore Golden<br>258 Banner Ave., Ventura, Calif. 91403 |
|---|---|---|
| [21] | Appl. No. | 2,246 |
| [22] | Filed | Jan. 12, 1970 |
| [45] | Patented | Dec. 28, 1971 |

[54] TRANSPORT CONVEYOR STRUCTURE
8 Claims, 6 Drawing Figs.

[52] U.S. Cl. .................................................. 198/213
[51] Int. Cl. .................................................. B65g 33/00
[50] Field of Search............................................ 198/213, 64

[56] References Cited
UNITED STATES PATENTS

| 2,279,201 | 4/1942 | Kozak ......................... | 198/213 |
| 2,599,615 | 6/1952 | Dahlberg ..................... | 198/213 |
| 2,849,105 | 8/1958 | Touton ......................... | 198/213 |
| 2,610,727 | 9/1952 | Beldin ......................... | 198/213 |
| 3,104,757 | 9/1963 | Dougherty .................... | 198/213 |

*Primary Examiner*—Richard E. Aegerter
*Attorney*—William E. Sherwood

ABSTRACT: A screw conveyor of the axially rotatable rail-type has cylindrical sections connected internally in end-to-end relation and with narrow transition gaps in the propelling screws of the sections at their junctions. A reversible motor drives the assembled conveyor sections which are supported by means of thin suspension members interposed between the ends of adjacent sections.

INVENTOR.
STEVE T. GOLDEN
BY W.E. Sherwood,
atty

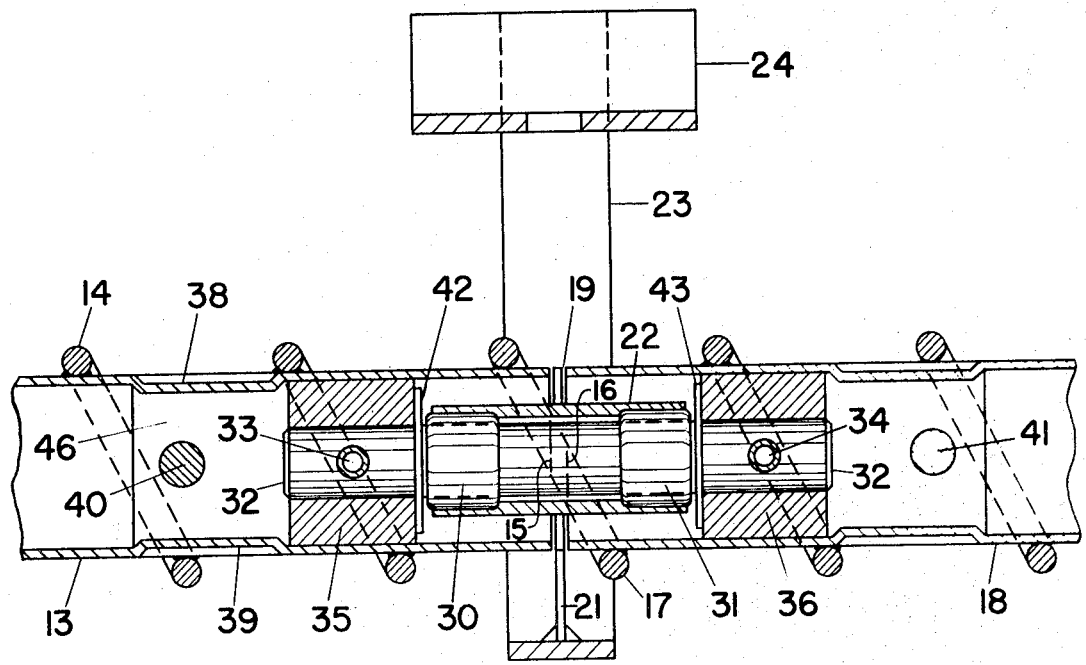
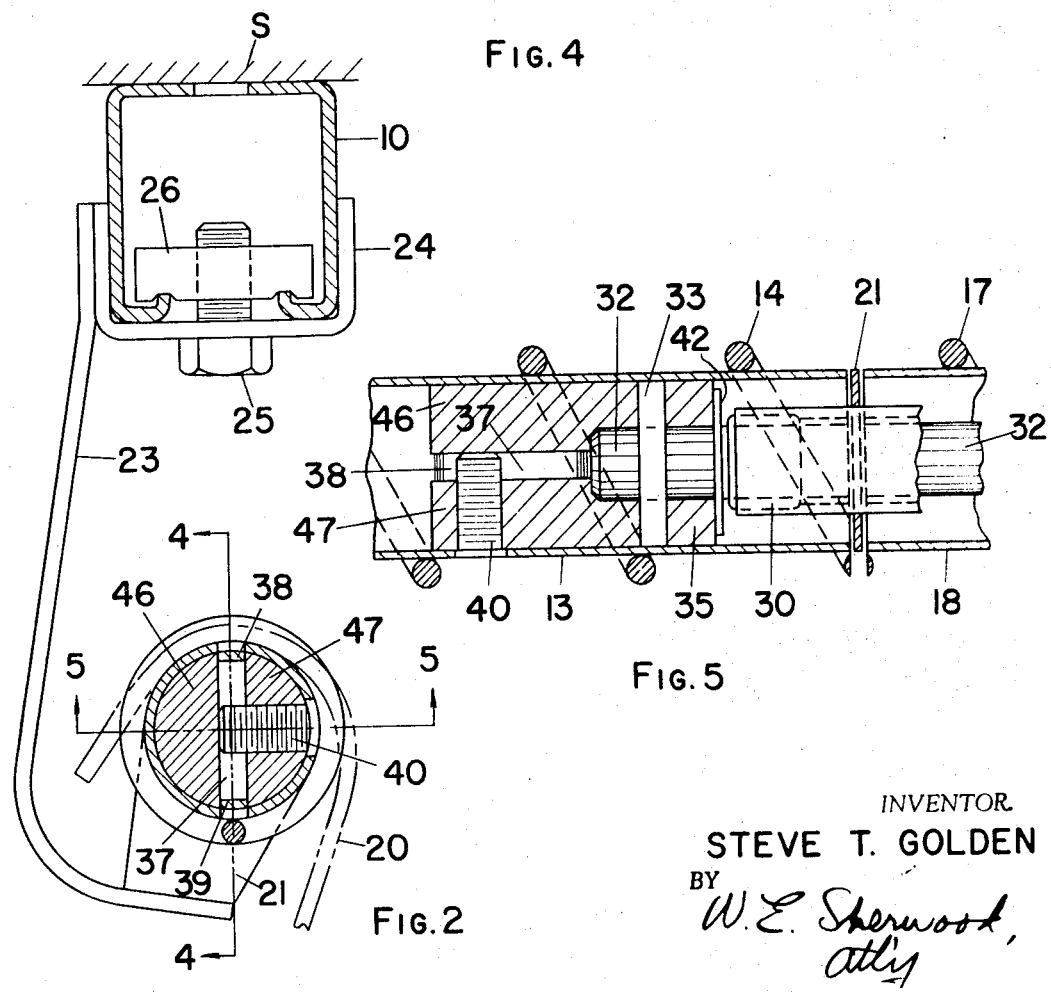

TRANSPORT CONVEYOR STRUCTURE

BACKGROUND OF THE INVENTION

The use of axially rotatable rail-type screw conveyors for transporting articles, such as clothing hung on conventional clothes hangers, has long been practiced despite certain inherent disadvantages with which the operator must contend. When the conveyor is constructed with an uninterrupted screw and the suspension takes the form of an external saddle or cradle touching that screw, it is possible for bent hangers to jam in attempting to pass beyond the saddle, or for the clothing, headdress, hair, or finger of a careless operator to become entangled with the screw and saddle while the conveyor is rotating. Limitations of this character have contributed generally to relatively low capacities for rail conveyors of this type.

The commercial suitability of conventional conveyors of the described type frequently is limited, moreover, by requirements for lubrication of moving parts capable of carrying the loads involved; by the likelihood of chattering or noisy operation; and by the relatively slow speed of operation as compared with other types of conveyors. It is these and other disadvantages of the rail-type screw conveyor which it is a purpose of this invention to improve upon, if not to eliminate entirely.

SUMMARY OF THE INVENTION

The invention comprises an article-transporting screw conveyor of the axially rotatable type having a number of conveyor sections joined end to end with screw portions which are in helical prolongation with each other. The sections are so supported as to have narrow transition gaps between the ends of the adjacent screws and to enable the transported article to be propelled smoothly and reliably across the gaps. One or more reversible motors are employed to drive the conveyor and, if desired, a motor may be located intermediate the ends of the conveyor.

Among the objects of the invention is the provision of a simple, low cost, lightweight and smoothly operating screw conveyor having a helical screw extending throughout its length for transporting articles suspended on hangers propelled by the screw. Another object is the provision of a rail-type screw conveyor whose peripheral outer surface is free from engagement with guide shoes or external bearings. A further object is the provision of a rail conveyor which may be axially rotated in either direction by a drive means located at either or both of the ends of the conveyor, or from a location intermediate the ends of the conveyor.

A still further object is the provision of an improved supporting structure for a rail conveyor having bearings disposed internally of the axially rotating helical screw of the conveyor and eliminating jamming of articles against a supporting structure as they are propelled by the screw.

These and other objects and advantages of the invention will become more apparent as the description proceeds and when considered in conjunction with the accompanying drawings in which:

FIG. 2 is a view to a larger scale taken on line 2—2 of FIG. 1 and indicating the travel of a hanger along the conveyor;

FIG. 4 is a sectional view taken on line 4—4 of FIG. 2 and indicating the coupling of adjacent conveyor sections;

FIG. 5 is a sectional view taken on line 5—5 of FIG. 2 and showing further details of the coupling.

Figure 1:
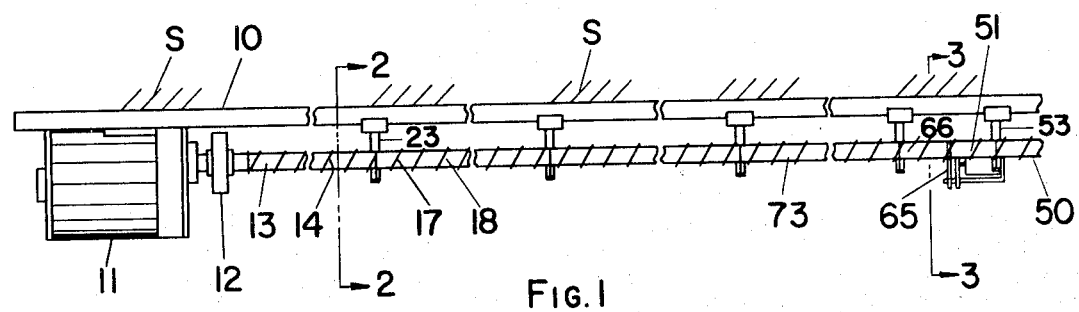
FIG. 1 is a side elevation view of an assembled conveyor with portions broken away.

Referring now to FIG. 1, the conveyor is normally supported from a conventional structural channel 10, later to be described, and which in turn is mounted upon a wall, ceiling or other support and at a suitable elevation so that suspended articles carried by the conveyor will travel in a path for convenient handling. At one end of the conveyor a motorized gear reduction unit 11, preferably of the reversing type and controlled by a switch not shown, is connected to a slip clutch 12, or other type of torque-limiting device which in turn is connected to one end of the adjacent conveyor section 13. The output of this drive is such as to permit a relatively high speed of rotation, for example about 100–120 r.p.m. As will be understood, the clutch 12 serves to disconnect the drive only when the load upon the conveyor becomes very high or when some abnormal condition causes a positive interference to the normal rotation of the screw conveyor.

The conveyor section 13 may take various forms without departing from the invention, but is illustrated in a tubular cylindrical form with a helical screw portion 14 of uniform pitch on its outer surface. Preferably, this screw portion comprises a wire or the like rigidly affixed to the tube but optionally may comprise a suitable groove formed in the tube. As best shown in FIG. 4, the end 15 of screw 14 terminates in a slanted configuration which matches the end 16 of the screw 17 on the confronting conveyor section 18 and is in helical prolongation thereof. A narrow transition gap 19, which normally is less than the cross section of a clothes hanger 20 which is to be propelled across that gap, separates the confronting ends of the conveyor sections and provides a space for the improved conveyor suspension member now to be described.

This suspension member preferably comprises a thin plate 21 having a tubular bushing 22 projecting normally thereto and extending axially into the confronting ends of each of the adjacent conveyor sections 13 and 18 and aligned with a hole in the plate. At its lower end the plate 21 extends laterally in a direction away from the path of travel of the hanger 20 (FIG. 2) and is joined to a bracket 23 which extends upwardly a suitable distance and is affixed to a U-shaped bracket 24. This bracket is adapted for adjustable attachment as by a clamping bolt 25 engageable with a nut 26 disposed within the channel 10 which has a longitudinally extending slot on its under surface. Conveniently, the channel may comprise the power strut channel type PS-200SL available from the Van Huffel Tube Corp., Warren, Ohio, and serves to define the path for the conveyor mounting. As will be understood, the channel may include curves and inclines and is not necessarily in a straight line in one plane since the invention comprehends the use of brackets 23 of different lengths and the use of curved and inclined conveyor sections.

Considering now FIGS. 2, 4 and 5, the respective ends of the bushing 22 are formed with spaces in which tubular needle bearings 30, 31 are housed in friction-reducing engagement with an elongated shaft 32 serving as a coupling means between adjacent conveyor sections. Attached to this shaft by means of pins 33, 34 are the respective drive plugs 35, 36 which are disposed in the confronting open ends of the respective tubular conveyor sections 13 and 18 beyond the ends of the bushing 22. As seen in FIG. 2, the outer end of the drive plug 35 is provided with a diametrical slot 37, as is the outer end of the plug 36, and this is engaged by longitudinally lanced strips 38, 39 pressed inwardly of the conveyor sections between adjacent turns of the screw. The bifurcated legs 46 and 47 at the sides of slot 37 provide frictional engagement with the inner surface of the tubular section 13. Engagement of the plugs with the strips serves to position the ends 15, 16 of the screws in proper relative position and to hold the same against radial displacement while the conveyor is propelling a heavy load. Shifting of the assembled parts is conveniently prevented by socket head setscrews 40 and 41 accessible from one side of the conveyor sections and bearing upon the bifurcated legs of the plug so as to expand the plugs into tight engagement with the inner surface of those tubular sections. In addition, thrust washers 42 and 43 affixed to the shaft 32 between the outer ends of the drive plugs and the ends of the bushing serve to assist in preventing longitudinal displacement of the described assembly. As will now be seen, rotation of the unit 11 which may be supported in any conventional manner from the channel 10, turns the screw conveyor section 13 whose lanced strips 38, 39 drive the plug 35 and through the connected shaft 32 drives the adjacent conveyor section 18. The interior bearing mounting provided by the suspension plate 15, moreover, provides a rigid connection which may rotate in either direction at high speed without the vibration associated with holddown clamps as found in conventional rail conveyors.

Figure 6:
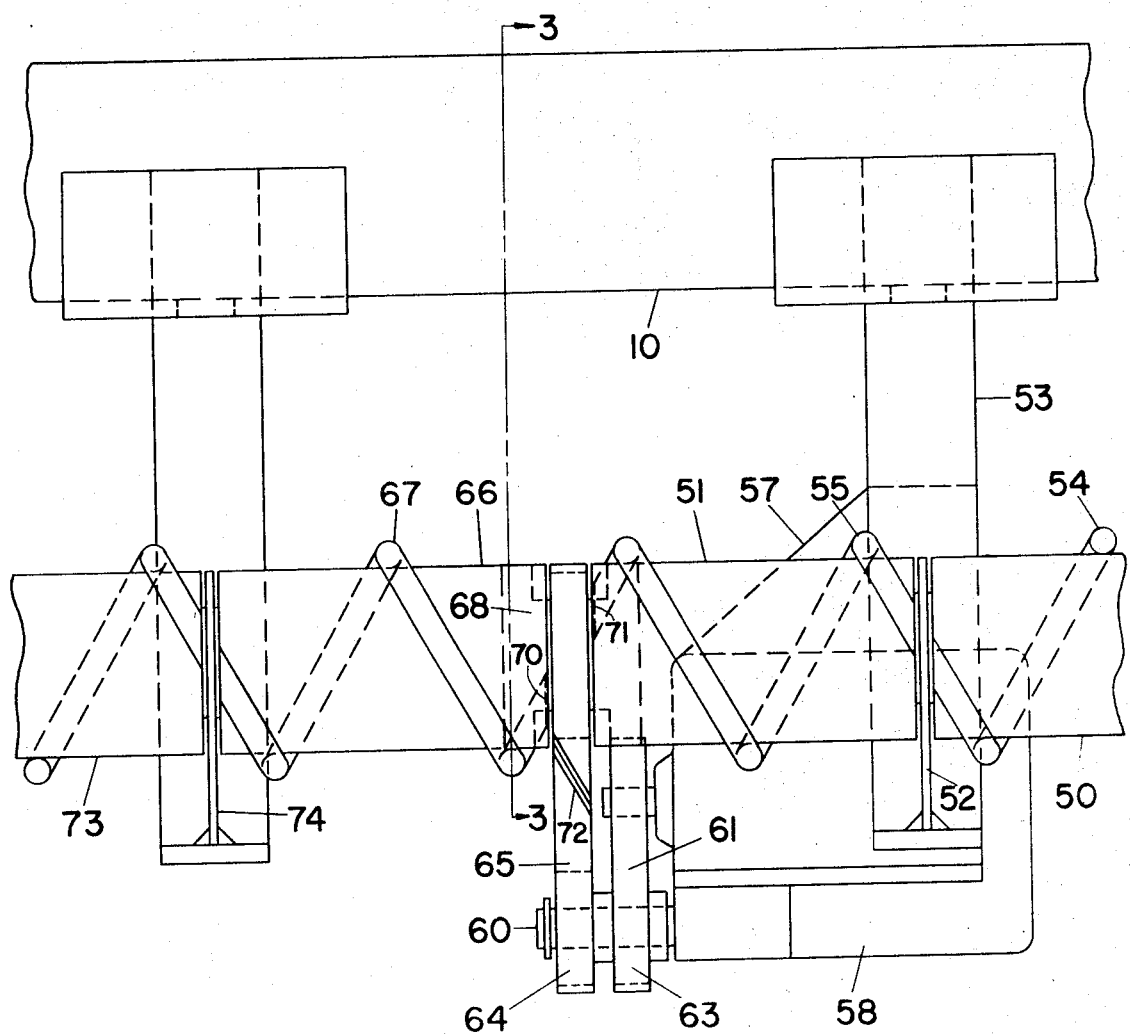
FIG. 6 is a side elevation view to a larger scale and showing further details of the mounting of the supplementary drive.
Figure 3:
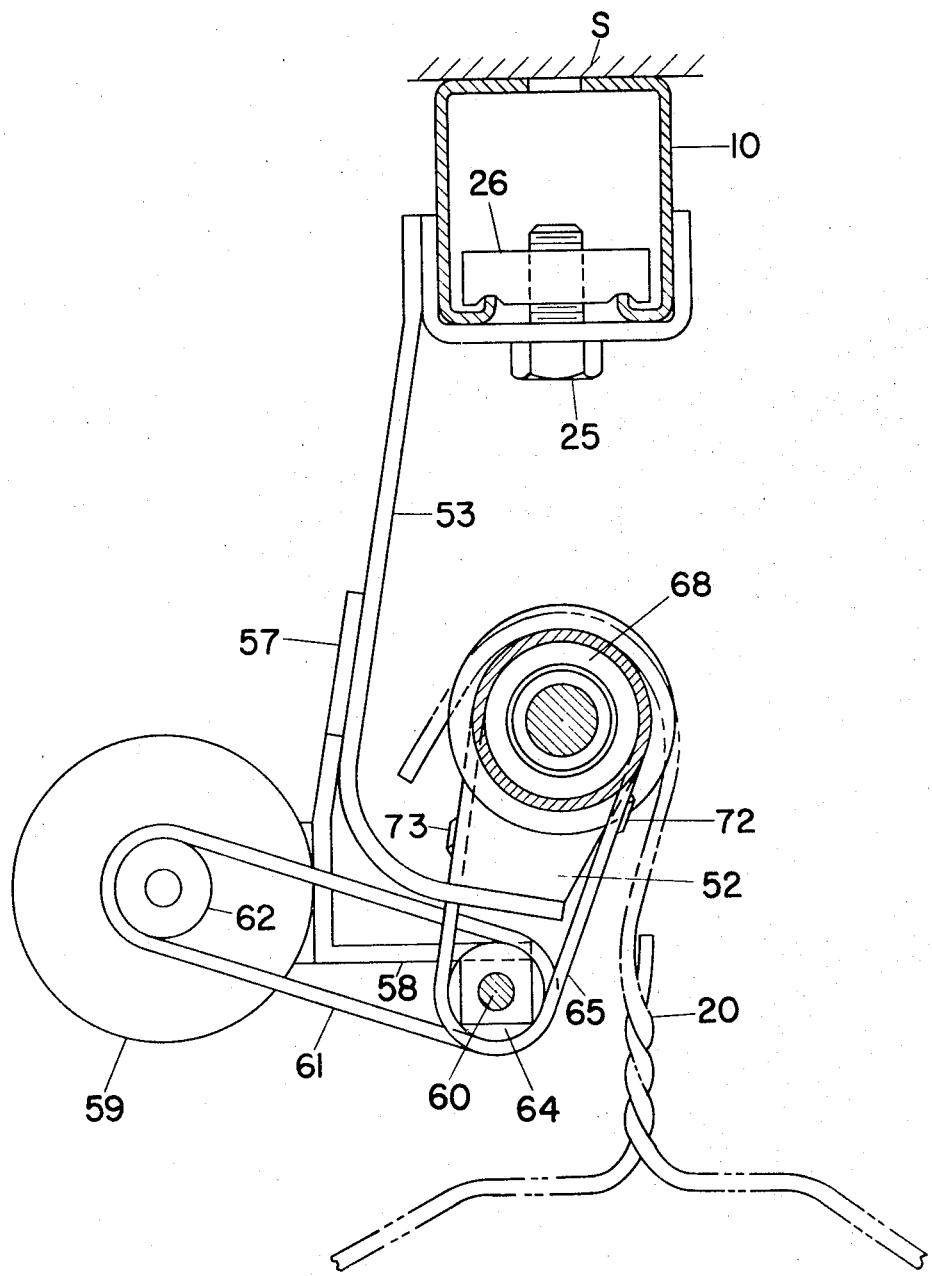
FIG. 3 is a view to a larger scale taken on line 3—3 of FIG. 1 and indicating the mounting of a supplementary drive for the conveyor.

Any number of straight conveyor sections may be connected in end-to-end relationship, or a modified flexible conveyor section of nontubular form (not shown) may be used without departing from the invention, as when the conveyor path is to have a curved section, or an inclined section. In such cases, however, the nontubular section will be of cylindrical cross section and will have a screw on its outer surface with the same pitch as the screw on the horizontal straight section and with the screws in prolongation with each other across the transition gap. As a further modification, the conveyor may be driven wholly or supplementarily by a drive means located intermediate the ends of the conveyor. Referring now to FIGS. 3 and 6, a conveyor section 50 connected to a short section 51 as above described and supported by plate 52 with its bracket 53 attached to channel 10, has a screw 54 which cooperates with screw 55 of the short section 51 across the narrow transition gap 56.

Supported upon bracket 53 is a second bracket 57 providing a framework 58 for mounting of a gear-reduction type of reversible motor 59 and a stub shaft 60 which is offset from the path of movement of hanger 20, as best seen in FIG. 3. By means of a belt 61 driven by pulley 62 on the motor shaft, a pulley 63 on the shaft 60 drives another pulley 64 on the same shaft. Preferably, the pulley 64 has a cogwheel configuration and the belt 65 driven thereby is relatively thin axially of the conveyor and has a notched inner surface engageable with the pulley 64 and with the connection which joins the short conveyor section 51 and its companion short section 66 on which the screw 67 is located. This connection, generally indicated at 68, serves to hold the sections 51 and 66 rigidly in alignment and to provide an interiorly located cogwheel-type pulley driven by engagement of belt 65 therewith. As will be noted, motor 59 thus serves to drive the connected short conveyor sections and the other sections connected to the ends of these short sections.

The confronting ends 70 and 71 of the screws 67 and 55 are in helical prolongation of each other, but are separated by a greater transition gap than that associated with the plate 52. Normally, the hanger 20 has no difficulty in crossing this gap as it is propelled by the screws, but to assist its movement the belt 65 may be provided on its outer surface with a series of slanted flights 72, 73 which are so spaced as to form bridges between the ends 70, 71 of the screws as rotation of the assembly takes place. As will be understood, the described short section 66 of the conveyor is connected at its other end to another conveyor section 73 and supported by one of the described suspension plates 74.

With the foregoing in mind, it will be seen that the apparatus lends itself to a simple and easy method of mounting and assembly. Upon determining the length and pattern of travel required of the conveyor, the appropriate sections of the overhead channel 10 are mounted upon a stationary support indicated generally at S. The conveyor sections may then be assembled with the drive motor or motors and with suitable suspension members of desired lengths interposed between the ends of adjacent sections. The assembly may then be raised to engage the several bolts 25 with the nuts 26 interiorly of the fixed channel at the appropriate locations along the channel. When properly mounted a strong assembly results and which is capable of handling heavier loadings of articles movable at greater speeds than conventional rail conveyors.

It is apparent that various changes can be made in the above disclosure of the invention without departing from the spirit thereof. Therefore, it is intended that all matter contained in the above description or in the accompanying drawings be interpreted as illustrative, and not in a limiting sense.

What is claimed is:

1. An article-transporting screw conveyor of the axially rotatable rail type including a plurality of cylindrical conveyor sections each having a helical screw portion on its peripheral outer surface, said conveyor sections supporting the article to be conveyed and with the article being suspended at all times below a conveyor section, a suspension member having a thin plate interposed between the ends of adjacent conveyor sections and supporting the conveyor sections in end-to-end relation with the separated ends of the screw portions thereof in helical prolongation with each other, said suspension member including an elongated bushing having a bearing portion disposed axially of and within the ends of the confronting sections, a rotatable coupling means journaled in said bushing and connected to the respective confronting conveyor sections internally of the sections, and motor means connected to the assembled conveyor sections for driving the same with an axial rotation while the article is suspended from said sections.

2. Apparatus as defined in claim 1 wherein said motor means is connected to the outer end of a conveyor section at the extreme end of the conveyor.

3. Apparatus as defined in claim 1 wherein said motor means is connected to a conveyor section intermediate the ends of the conveyor.

4. In an article-transporting screw conveyor of the axially rotatable rail type having a pair of conveyor sections of tubular form, means for supporting said sections and for coupling the same for rotation as a unit and comprising, a thin plate adapted for interposition between the confronting ends of the conveyor sections normal to the axis of said sections, said plate having a bracket attached to the lower end thereof and extending to an elevated support, a tubular bushing attached to said plate and extending axially into the ends of the confronting conveyor sections and surrounding an axial aperture in said plate, a shaft within said bushing extending through said aperture, a pair of plugs disposed within the respective confronting tubular ends of said sections and rigidly attached to the ends of said shaft, and means for securing said plugs to the inner surfaces of said sections whereby upon rotation of one of said sections the other of said sections will be rotated simultaneously and with the conveyor supported by said plate.

5. Apparatus as defined in claim 4, including bearings mounted interiorly of the ends of said bushing and engaging with said shaft.

6. Apparatus as defined in claim 4 wherein said plugs include bifurcated distal ends separated by a diametrical slot and said conveyor sections include inwardly pressed longitudinally extending portions engageable within the slots of said plugs thereby to restrain said plugs against radial shifting after assembly of the coupling means.

7. Apparatus as defined in claim 6 including means adjustable externally of the conveyor sections for expanding the distal ends of said plugs into tight engagement with the inner surface of said tubular conveyor sections.

8. Apparatus as defined in claim 5 including thrust washers attached to said shaft and engageable with the proximate ends of said plugs thereby to restrain longitudinal shifting of one of said conveyor sections with respect to the other.

* * * * *